Aug. 23, 1938.  J. W. THOMPSON ET AL  2,127,575
INDUCTION THERMOSTATIC DEVICE
Filed Jan. 4, 1936   2 Sheets-Sheet 1
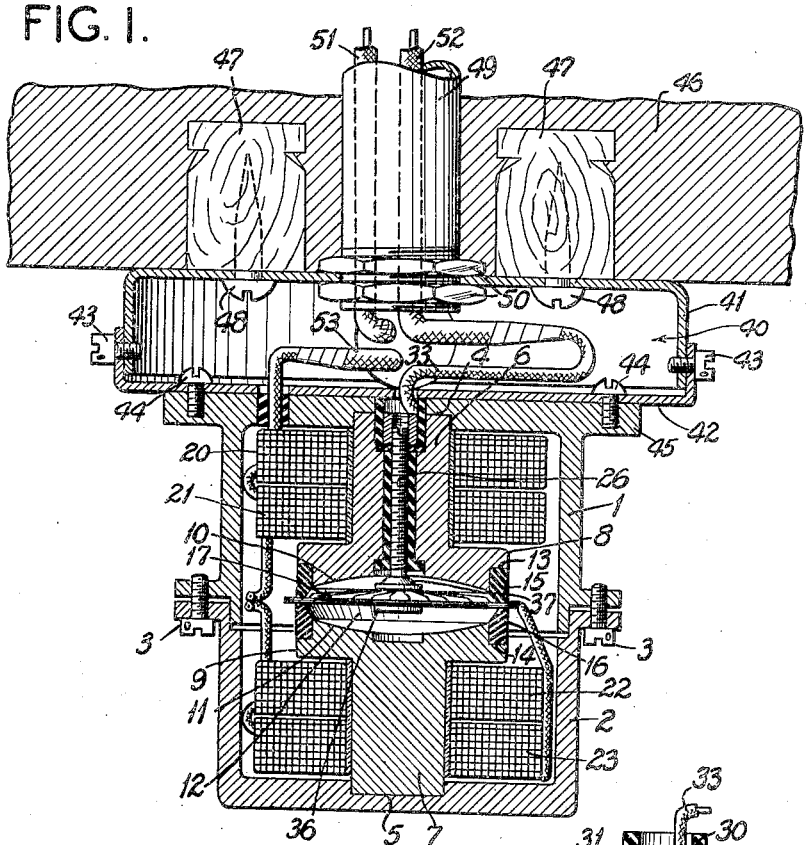
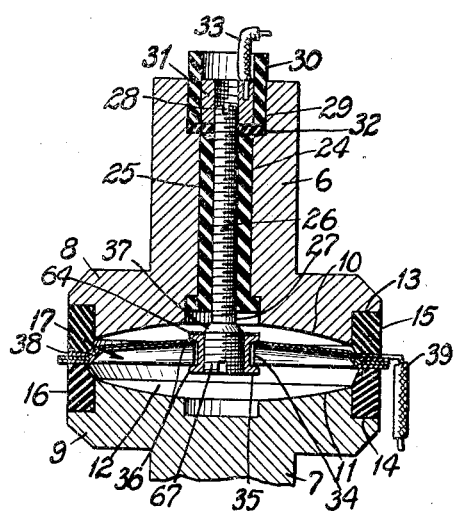
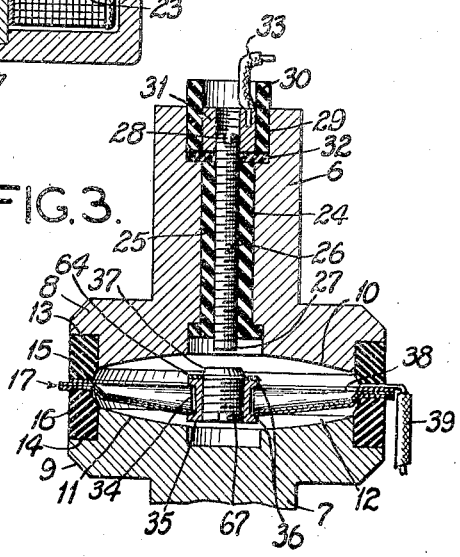
John West Thompson,
Virgil E. Metcalfe,
Inventors,
Delos G. Haynes,
Attorney.

Aug. 23, 1938.    J. W. THOMPSON ET AL    2,127,575
INDUCTION THERMOSTATIC DEVICE
Filed Jan. 4, 1936    2 Sheets-Sheet 2
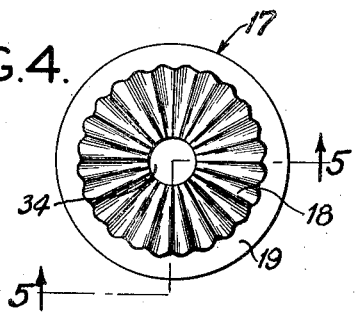
FIG. 4.
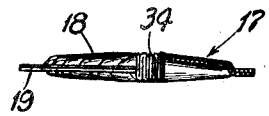
FIG. 5.
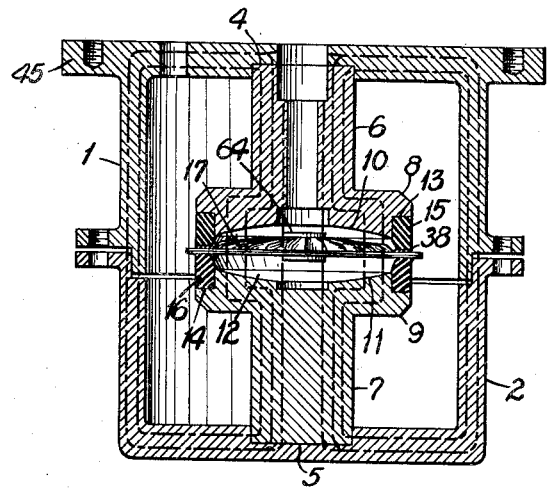
FIG. 6.
FIG. 7.

Patented Aug. 23, 1938

2,127,575

UNITED STATES PATENT OFFICE 2,127,575

INDUCTION THERMOSTATIC DEVICE

John West Thompson and Virgil E. Metcalfe, Puebla, Mexico

Application January 4, 1936, Serial No. 57,486
In Mexico January 17, 1935

7 Claims. (Cl. 200—88)

This invention relates to thermostatic induction devices, and with regard to certain more specific features, to thermostatic induction devices particularly adapted for use as alternating current limiters.

Among the several objects of the invention may be noted the provision of a device of the class described including induction means and thermostatic means, the thermostatic means being actuated to operation by heat generated therein by induced eddy currents and hysteresis losses produced by the induction portion of the device; the provision of a device of the class described in which the thermostatic member is snap-acting whereby a more ready and effective, and usable control is effected; and the provision of a device of the class described which is simple and compact in construction and reliable in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which is illustrated one of various possible embodiments of the invention, Figure 1 is a longitudinal cross section of a device embodying the present invention;

Figures 2 and 3 are enlarged fragments of the device as shown in Fig. 1, illustrating alternative positions of the thermostatic element;

Figure 4 is a plan view of a thermostatic element;

Figure 5 is a cross section taken substantially along line 5—5 of Fig. 4;

Figure 6 is a longitudinal cross section of certain elements of the apparatus, illustrating lines of magnetic flux set up in the apparatus in operation; and, Figure 7 is a circuit diagram showing one use of the present invention.

Similar reference characters indicate corresponding parts throughout the several views of the drawings.

The present invention has particular utility in the field of alternating current limiters. Such limiters, for example, are frequently installed in a distribution system where the cost of a watt-meter is prohibitive. By means of such limiters, the current which a customer can consume is automatically limited, while the period of time during which he can consume the current is not limited. The price to the consumer is figured on the basis of the limited current which he can draw from the system, and it is therefore necessary to provide a device which prevents the consumer from obtaining more current than he is entitled to.

However, the invention has utility in certain other fields to be pointed out hereinafter.

Referring now more particularly to Fig. 1, there is illustrated an embodiment of the invention particularly designed for current-limiting functions. Index characters 1 and 2 indicate the two halves of a cylindrical steel case, each half being relatively cup-shaped. The two halves 1 and 2 are connected together by means of facing flanges and bolts 3. The inner end faces of the halves 1 and 2 are recessed, or countersunk on the inside as indicated at numerals 4 and 5, respectively, to receive the ends of two pole pieces 6 and 7, respectively. The casings 1 and 2, and the pole pieces 6 and 7, together form a structure quite similar to a completely enclosed shell-type transformer with a split inner pole. The inner ends 8 and 9 of the pole pieces 6 and 7 are somewhat enlarged in diameter, and inwardly dished as indicated at numerals 10 and 11 so that when they are juxtaposed, they form an inner hollow space 12. The ends 8 and 9 of the pole pieces 6 and 7 are also provided with peripheral grooves 13 and 14, respectively, which receive rings 15 and 16 formed of insulating material such as fiber. The rings 15 and 16 fit with a tight, shrink fit on the pole pieces 6 and 7.

The inner edges of the rings 15 and 16, which are slightly tapered, cooperate to clamp therebetween a thermostatic element 17.

The thermostatic element 17 is indicated in greater detail in Figures 4 and 5. It is a radially corrugated, dished, thermostatic metal (such as bimetal) disc as described and claimed in John A. Spencer Patent 1,895,591, dated January 31, 1933.

The disc 17, referring to Figures 4 and 5, comprises a central radially corrugated portion 18, and a flattened peripheral rim 19. As initially manufactured, the central portion 18 is slightly conical in one direction. When the disc 17 is heated, relative difference in expansion in the metals comprising its several layers causes the disc to snap through to a position of opposite conicity. As this disc and its operation are described in great detail in said John A. Spencer Patent 1,895,591, it is not necessary to repeat such description herein.

It is the flat peripheral rim portion 19 of the disc 17 that is clamped between the rings 15 and 16. This clamping action is not sufficiently tight, however, to impair or restrict the movement of the disc 17 in response to temperature changes therein.

In assembly, it is desirable that the concave faces 10 and 11 of the pole pieces 6 and 7 be covered with thin insulating paper, to prevent the disc 17 from coming into direct contact with the iron, or steel.

Referring again to Fig. 1, numerals 20, 21, 22, and 23 indicate four coils or windings which are placed, two each, upon the pole pieces 6 and 7. The coils 20, 21, 22, and 23 are shown as connected in series, but they may be connected in parallel or in series and parallel, thereby making it possible to vary the capacity of the apparatus to suit different current loads.

Extending axially through the pole piece 6 is a hole 24 into which is pressed a fiber or other insulating material tube 25. The fiber tube 25 is inwardly threaded to receive a brass or similar stem 26 which has a platinum or similar good contact metal contact point 27 at its lower end. The screw 26 is provided at its upper end with a slot 28 for screw driver adjustments.

The upper end of the hole 24 is counterbored as indicated at numeral 29, and into this counterbore is fitted a fiber or like insulating material collar or washer 30. Fitting snugly inside the washer 30 is a metal collar 31 which is threaded on the end of screw 26. A fiber washer 32 insulates the collar 31 from electrical contact with the core metal. An electrical connection, indicated by a wire 33 in Figures 2 and 3, is made to the collar 31, and thence through screw 26 to the contact point 27.

The thermostatic disc 17 has provided therein a central opening 34 (see also Fig. 4). Into this opening 34 is fitted a steel bushing 35 which is retained in position by outwardly extending flanges 36. The bushing 35 is inwardly threaded to receive a brass screw 67, which carries on its upper face a platinum or like good contact metal contact 37.

In order to make electrical connections to the disc 17, there is provided a copper ring or gasket-shaped member 38 which is placed in contact with the flat periphery 19 of the disc 17, and held in position by engagement of the fiber rings 13 and 14. A wire 39 is connected to the ring 38.

Referring again to Fig. 1, numeral 40 indicates a connection box comprising a cup-shaped steel box 41 and a steel cover 42 held thereto by set screws 43. Screws 44 pass through the cover 42 and engage suitably threaded openings in a flange 45 extending outwardly from the upper casing member 1, thereby holding the casing and its assembly to the connection box 40. The box 41 is attached to the wall or base 46, by means of wood plugs 47 and wood screws 48. A conduit tube 49 coming through the wall 46 is attached to the connection box 40 with lock nuts 50. The conduit 49 contains wires 51 and 52 which are connected, exteriorly of the box, to the line power source.

The electric connections of the system are indicated in Fig. 7. It will be seen that the wire 51 goes directly to a customer's main switch 58. The switch 58 in turn controls a lamp bank or other suitable current-consuming device indicated by numeral 59. The wire 52 on the other hand, connects with the wire 33 and thence to the screw 26 and contact 27. The wire 39 coming from the thermostatic disc 17 connects with one of the coils which are shown connected in series. The other end of the coils are connected by a wire 53 to the other terminal of switch 58. It will thus be seen that the inner, thermostatic assembly comprises a switch in series with the induction coils and with the source of power.

The operation of the embodiment as thus described is as follows:

Suppose, for example, that the limiter is adjusted for a load of three lamps of 40 watts each, at 120 volts, one ampere current. As long as the disc 17 is in its upwardly conical position as indicated in Figures 1 and 2, the contacts 27 and 37 are juxtaposed, and alternating current circulates through the coils 20, 21, 22 and 23 of the limiter producing a certain alternating or pulsating magnetic flux through the cylindrical cases 1 and 2 and the pole pieces 6 and 7. The flux lines are indicated by dotted lines in Figure 6. It will be seen that they pass directly through the thermostatic disc 17 and the air space between the poles and the disc.

The alternating magnetic flux density in the walls and covers of the casings 1 and 2, and in the pole pieces 6 and 7, is normally very low and the ohmic resistance of the copper in the coils is also very low. However, as the thermostatic disc is composed of thin, corrugated metal, the density of the magnetic flux which goes through it is relatively high, reaching and sometimes exceeding, the saturation point.

It will be noted that the conformation of the thermostatic disc 17 is such that its radial corrugations provide more metal in close juxtaposition in the central portion of the disc than toward the periphery of the same. Because the entire disc is subjected to a substantially uniform alternating magnetic flux, this disposition of metal in the disc means that the flux density is greater in the center of the disc than in its periphery. Unequal distribution of flux across the surface of the disc induces Foucault or eddy currents therein. These Foucault currents, being at a high amperage and low resistance, produce a substantial heating effect which goes to increase the temperature of the disc.

As a general proposition, the two metals of which the disc 17 is made, comprise, for example, 42% nickel steel and 45% nickel steel. Both of these metals have a relatively high magnetic permeability. There is accordingly also a generation of heat in the disc 17 itself by the hysteresis losses of the two magnetic metals composing the disc owing to the high magnetic flux density in the same.

It may be noted at this point that the method herein provided for heating the disc 17 by means of alternating magnetic flux and induced Foucault currents and hysteresis losses, is substantially the most efficient method of heating a thermostatic disc that has as yet been proposed. This is because the heat is generated in the disc itself and losses incident to conduction of the heat from an outside source into said disc are therefore totally eliminated. This method is also more efficient than the heretofore-proposed method of connecting the disc directly in series in an electric circuit and depending upon the resistance of the disc to the current flow to induce a heating effect, because in any such circuit, it is inevitable that a certain portion of the heating effect is lost because of the heat generated in the wires of the circuit. It is, of course, recognized that the production of the magnetic flux requires a certain expenditure of energy, but this is relatively small.

Supposing now that the apparatus has been adjusted to carry permanently a load of one ampere, which corresponds to the three lamps of 40 watts of 120 volts each which the customer has in service, the Foucault currents in the thermostatic disc 17 are not sufficiently intense to heat it to the temperature necessary to cause it to snap through to the position shown in Fig. 3, but if this load of one ampere (hereinbefore specified) is exceeded beyond a margin of tolerance, and for example, reaches 1.3 amperes, then the magnetic flux increases, and the Foucault currents induced in the disc 17 have a magnitude great enough to heat the disc to its snapping temperature, and the disc, which normally occupies the position indicated in Fig. 2, suddenly changes the direction of its conicity to take the shape shown in Fig. 3. When the disc 17 thus changes its position, the contacts 27 and 37 are separated, interrupting the flow of current to the customer's installation.

When the current ceases to circulate, the magnetic flux, and hence the heating effect also ceases, and the disc cools little by little until, upon passing its reverse snapping temperature, it snaps back to its original position shown in Fig. 2, thereby springing the contact points 27 and 37 again into contact and thus reestablishing the circuit. The customer again receives current after an interruption lasting a few seconds.

If the current-consuming device which caused the overload, and consequently the functioning of the limiter, has been meanwhile disconnected from the circuit, the disc remains in the normal position and the contacts are no longer separated, permitting the current to flow indefinitely into the customer's installation. But if the overload is maintained, within a short time after the contacts 27 and 37 again make contact, the disc 17 is again heated by the Foucault currents and again snaps to opposite conicity and opens the circuit. This opening and shutting of the circuit continues as long as the overload exists.

In order to open the circuit as rapidly as possible, the bushing 35 positioned in the central opening 34 of the disc 17 is made of steel, but is provided at its upper end with a copper washer 64 (see Figs. 2 and 3). This causes the magnetic attraction of the pole piece 7 to be greater than that of the pole piece 6 because the magnetic part of the bushing 35 is nearer to the pole piece 7. In case of heavy overload or short circuit, this magnetic attraction downward is very great, making the action of the disc in opening the circuit much more rapid than when heating alone is relied upon.

If the installation of this apparatus is made in a three-wire system, the limiter is desirably connected in the phase-wire, the circuit then continuing from the limiter to the switch controlling the customer's installation. The neutral wire runs directly from the distribution mains of the electric company to the said switch. In other words, referring to Fig. 7, wire 52 is the phase-wire and wire 51 is the neutral wire. It is impossible for the consumer to invert the polarity either in the conduit 49 (Fig. 1) or in the limiter, and if inverted in the street, it can immediately be detected simply by observing the end of the conduit 49 at the entrance to the building. In a two-wire system it is inconsequential in which wire the limiter is connected.

While a corrugated thermostatic disc 17 of the type shown in the aforementioned Spencer Patent 1,895,591 is preferred as the thermostatic element of the present invention, it will be seen that under certain circumstances, it is quite feasible to use a non-corrugated, concave thermostatic metal disc of the type shown in John A. Spencer Patent 1,448,240, dated March 13, 1923. However, with such a disc, the Foucault currents are not induced in as great a quantity nor in the same manner, and the action is not so positive.

The invention has a utility outside of that in the field of current limiters, if it be considered as a form of relay of the thermostatic type. For example, if the coils 20, 21, 22 and 23 of the device are connected in series with an outside alternating current circuit and independently regulated, say by a room thermostat or similar switch, while the switch formed by the contacts 27 and 37 is connected in another circuit, independent of the circuit including the coils, the device constitutes a relay wherein the switch comprising the contacts 27 and 37 is closed, to close the circuit in which they are connected, only when the current in the circuit including the coils exceeds a predetermined volume. Further, it is not necessary that the thermostatic disc 17 operate an electrical switch. It may be connected to perform any other desired controlling action, such as, for example, the controlling of the position of a valve. In such event, a simple mechanical linkage could be provided in the device for transmitting the motion of the central portion of the disc, while undergoing snapping, to the valve closure element.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

We claim:

1. In apparatus of the class described, a snap-acting thermostatic disc, and means disposed on both sides of said disc creating an alternating magnetic flux through said disc, said magnetic flux inducing Foucault currents in said disc, said Foucault currents tending to heat said disc, so that, when a certain magnetic flux density is reached, the heating effect is sufficient to cause said disc to snap to its alternate position, said thermostatic disc carrying a device at the center thereof, said device being more susceptible to magnetic influence on one side than on the other, whereby upon abnormally great increase in magnetic flux density, the magnetic flux on said last-named device aids the heating effect in causing the disc to snap to its alternate position.

2. In apparatus of the class described, a casing of steel having substantially the form of a totally-enclosed shell-type transformer with a split central pole, windings on said central pole, and a snap-acting thermostatic disc disposed between the sections of said split pole and subjected to the alternating magnetic flux set up by the flow of alternating current through said windings.

3. In apparatus of the class described, a casing of steel having substantially the form of a totally-enclosed shell-type transformer with a split central pole, windings on said central pole, and a snap-acting thermostatic disc disposed between the sections of said split pole and subjected to the alternating magnetic flux set up by the flow of alternating current through said windings, said disc being so constituted that the magnetic flux passing therethrough induces Foucault currents, said Foucault currents tending to heat said disc, so that when a certain magnetic flux density is reached, the heating effect is sufficient to cause said disc to snap to its alternate position.

4. In apparatus of the class described, a casing of steel having substantially the form of a totally-enclosed shell-type transformer with a split central pole, windings on said central pole, and a snap-acting thermostatic disc disposed between the sections of said split pole and subjected to the alternating magnetic flux set up by the flow of alternating current through said windings, said disc being so constituted and disposed that the magnetic flux passing therethrough induces Foucault currents in said disc, said Foucault currents, as well as hysteresis losses in said disc, tending to heat said disc, so that when a certain magnetic flux density is reached, the heating effect is sufficient to cause said disc to snap to its alternating position.

5. Apparatus as set forth in claim 2 in which the thermostatic disc actuates circuit making and breaking means, said circuit making and breaking means being connected in series with said windings whereby the apparatus constitutes a current-limiting device.

6. Apparatus as set forth in claim 2 in which the thermostatic disc comprises a radially corrugated, snap-acting disc.

7. In apparatus of the class described, a transformer having a core of magnetic material, said core being shaped to provide a complete magnetic circuit, except for a single gap in the core, windings on said core, and a snap-acting thermostatic disc disposed in said gap between the faces thereof and in a manner substantially parallel to said faces, said thermostatic disc being subjected to the alternating magnetic flux set up by the flow of alternating current through said windings.

JOHN WEST THOMPSON.
VIRGIL E. METCALFE.